(12) United States Patent
Yoshitsune et al.

(10) Patent No.: US 11,187,325 B2
(45) Date of Patent: *Nov. 30, 2021

(54) SEALING DEVICE

(71) Applicant: NOK CORPORATION, Tokyo (JP)

(72) Inventors: Shuji Yoshitsune, Kumamoto (JP); Kota Henmi, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 16/061,978

(22) PCT Filed: Oct. 31, 2016

(86) PCT No.: PCT/JP2016/082211
§ 371 (c)(1),
(2) Date: Jun. 13, 2018

(87) PCT Pub. No.: WO2017/104278
PCT Pub. Date: Jun. 22, 2017

(65) Prior Publication Data
US 2018/0372223 A1 Dec. 27, 2018

(30) Foreign Application Priority Data
Dec. 15, 2015 (JP) ................................ 2015-243761

(51) Int. Cl.
F16J 15/3268 (2016.01)
F16J 15/10 (2006.01)
(Continued)

(52) U.S. Cl.
CPC ......... F16J 15/3268 (2013.01); F16J 15/104 (2013.01); F16J 15/125 (2013.01);
(Continued)

(58) Field of Classification Search
CPC .. F16J 15/166; F16J 15/32; F16J 15/56; F16J 15/3268
See application file for complete search history.

(56) References Cited

U.S. PATENT DOCUMENTS 3,394,941 A * 7/1968 Traub ........................ F16J 15/32
277/584
3,854,735 A 12/1974 Maurer et al.
(Continued)

FOREIGN PATENT DOCUMENTS

JP 46-31623 Y1 11/1971
JP 10-68467 3/1998
(Continued)

OTHER PUBLICATIONS

Official Communication issued in PCT/JP2016/082211, dated Jan. 17, 2017.
(Continued)

Primary Examiner — Kristina R Fulton
Assistant Examiner — L. Susmitha Koneru
(74) Attorney, Agent, or Firm — Greenblum & Bernstein, P.L.C.

(57) ABSTRACT

A sealing device in which diameter expansion of an inserted first back-up ring is suppressed. The sealing device includes a seal ring mounted in a rectangular mounting groove, the first back-up ring, and a second back-up ring. The first back-up ring has an end surface contacting an opposing-sealing-fluid-side side surface of the mounting groove. The second back-up ring has an end surface contacting the seal ring. A contact surface in an inner peripheral end of second back-up ring is perpendicular to the axis to contact an opposing-sealing-fluid-side side surface of the mounting groove. The inner diameter of the first back-up ring is set to be larger than the outer diameter of the contact surface portion of the second back-up ring, and the outer diameter (Continued)

of the first back-up ring is set to be smaller than the inner diameter of a housing.

14 Claims, 3 Drawing Sheets

(51) Int. Cl.
  *F16J 15/48* (2006.01)
  *F16J 15/16* (2006.01)
  *F16J 15/12* (2006.01)
  *F16J 15/46* (2006.01)
(52) U.S. Cl.
  CPC ............ *F16J 15/166* (2013.01); *F16J 15/46* (2013.01); *F16J 15/48* (2013.01)

(56) References Cited

U.S. PATENT DOCUMENTS

| | | | | |
|---|---|---|---|---|
| 4,034,993 | A * | 7/1977 | Okada | F16J 15/166 |
| | | | | 277/611 |
| 4,387,902 | A * | 6/1983 | Conover | F16J 15/324 |
| | | | | 277/560 |
| 4,489,953 | A * | 12/1984 | Witt | F16J 15/065 |
| | | | | 277/584 |
| 9,388,901 | B2 * | 7/2016 | Nuennerich | F16J 13/02 |
| 10,344,865 | B2 * | 7/2019 | Henmi | F16J 15/3216 |
| 2003/0122322 | A1 | 7/2003 | Tremoulet, Jr. et al. | |
| 2012/0038113 | A1 | 2/2012 | Dietle et al. | |
| 2014/0312570 | A1 * | 10/2014 | Foster | F16J 15/06 |
| | | | | 277/312 |
| 2016/0356381 | A1 * | 12/2016 | Henmi | F16J 15/3216 |
| 2017/0292607 | A1 * | 10/2017 | Monma | F16J 15/18 |

FOREIGN PATENT DOCUMENTS

| | | | |
|---|---|---|---|
| JP | 2010-190314 | | 9/2010 |
| JP | 2012154387 | A * | 8/2012 |
| WO | 2015/133595 | | 9/2015 |

OTHER PUBLICATIONS

Official Communication issued in European Patent Office (EPO) Patent Application No. 16875263.2, dated Nov. 15, 2018.

* cited by examiner

SEALING DEVICE

BACKGROUND OF THE INVENTION

Field of the Invention

The present invention relates to a sealing device pertaining to sealing technology. The sealing device according to the present invention is suited to be used particularly as a high-pressure seal for sealing in high-pressure sealing fluid.

Description of the Conventional Art

A sealing device 1 shown in FIG. 2 is conventionally known as a high-pressure seal. This sealing device 1 is placed between two members 51 and 52 facing each other to seal sous to prevent sealing fluid on the high-pressure side H from leaking to the low-pressure side L, and is a combination of a seal ring 11, a relatively hard first back-up ring 21, and a relatively soft second back-up ring 31. The seal ring 11 is mounted in an annular mounting groove 53 provided on one of the two members 51 and 52, namely the member (for example, a shaft) 51, and is in close contact with the other member (for example, a housing) 52. The first back-up ring 21 is placed on the opposing sealing fluid side (the low-pressure side L) of the seal ring 11. The second back-up ring 31 is placed between the seal ring 11 and the first back-up ring 21.

The mounting groove 53 is a groove with a rectangular cross-section because it is easy to process. The first back-up ring 21 is formed to have a triangular cross-section by having an end surface portion 21a that is a plane perpendicular to the axis, a peripheral surface portion 21b that is a cylindrical surface, and an inclined surface portion 21c. The end surface portion 21a is in contact with an opposing-sealing-fluid-side side surface portion 53b of the mounting groove 53; the peripheral surface portion 21b is in contact with the other member 52; and the inclined surface portion 21c intersects with the end surface portion 21a and the peripheral surface portion 21b. Likewise, the second back-up ring 31 is formed to have a triangular cross-section by having an end surface portion 31a that is a plane perpendicular to the axis, a peripheral surface portion 31b that is a cylindrical surface, and an inclined surface portion 31c. The end surface portion 31a is in contact with the seal ring 11; the peripheral surface portion 31b is in contact with a bottom surface portion 53a of the mounting groove 53; and the inclined surface portion 31c is provided to correspond to the inclined surface portion 21c of the first back-up ring 21.

In the sealing device 1 having the above-described configuration, the first back-up ring 21 is placed on the opposing sealing fluid side (the low-pressure side L) of the seal ring 11, and therefore, it is possible to prevent the seal ring 11 made of a rubbery elastic body from protruding into a gap 54 between the two members 51 and 52 and being damaged when subjected to high pressure P; furthermore, the second back-up ring 31 is placed between the seal ring 11 and the first back-up ring 21, and therefore, it is possible to prevent the seal ring 11 from protruding into a gap (not shown) between the first back-up ring 21 and the member 52 and being damaged.

PRIOR ART DOCUMENT

Patent Document

Patent Document 1: Japanese Unexamined Patent Publication No. 10-68467

SUMMARY OF THE INVENTION

Problem to be Solved by the Invention

However, in the above-described sealing device 1, the cross-sectional shapes of the first and second back-up rings 21 and 31 are both a simple triangular shape, thus the following disadvantages are pointed out.

That is, when the above-described sealing device 1 is installed between the two members 51 and 52, as shown in FIG. 3A, first, the sealing device 1 is mounted in the mounting groove 53 of the member 51, and then, together with the member 51, the sealing device 1 is inserted in the inner peripheral side (a shaft hole 52a) of the member 52 (an arrow x). However, the outer diameter size $d_1$ of the seal ring 11 before insertion may be larger than the inner diameter size $d_2$ of the shaft hole 52a; in this case, the following event occurs.

That is, as shown in FIG. 3B, at the time of the insertion, the outer periphery of the seal ring 11 interferes with an opening periphery 52b of the shaft hole 52a, thus the insertion of the seal ring 11 comes to a temporary halt; on the other hand, the insertion of the member 51 and the first and second back-up rings 21 and 31 pushed by the member 51 is continued (the arrow x), thus the distance t between the side surface portion 53b of the mounting groove 53 and the seal ring 11 is gradually reduced.

A corner 31d between the peripheral surface portion 31b and the inclined surface portion 31c of the second back-up ring 31 has an acute angle, and this acute corner 31d tends to be compressed in an axial direction when pressed against the side surface portion 53b of the mounting groove 53. Therefore, if the distance t between the side surface portion 53b of the mounting groove 53 and the seal ring 11 is reduced, the overall second back-up ring 31 moves to a direction of getting close to the side surface portion 53b of the mounting groove 53, and presses the first back-up ring 21. When the second back-up ring 31 has pressed the first back-up ring 21, the both back-up rings 21 and 31 are in contact at their inclined surface portions 21c and 31c, thus the first back-up ring 21 is deformed, which causes its outer diameter size to be expanded by the action of the moment of component force (an arrow y).

Therefore, as the insertion is further continued in a state where the first back-up ring 21 is deformed and its diameter is expanded in this way, the outer periphery of the first back-up ring 21 interferes with the opening periphery 52b of the shaft hole 52a, which may damage the first back-up ring 21.

In view of the above points, the present invention is for a sealing device composed of a combination of a seal ring mounted in a mounting groove with a rectangular cross-section, a first back-up ring, and a second back-up ring, and an object of the invention is to provide a sealing device that can suppress the diameter expansion of the first back-up ring when inserted, thereby suppressing the damage on the first back-up ring.

Means for Solving the Problem

To achieve the above-described object, a sealing device according to the present invention is one that is placed between two members facing each other to seal in sealing fluid, and includes a seal ring that is mounted in a mounting groove provided on one of the two members and is in close contact with the other member; a relatively hard first back-up ring placed on the opposing sealing fluid side of the seal ring; and a relatively soft second back-up ring placed between the seal ring and the first back-up ring. The mounting groove is a groove with a rectangular cross-section. The first back-up ring has a cross-sectional shape having an end surface portion in contact with the opposing-sealing-fluid-side side surface portion of the mounting groove, a peripheral surface portion facing the other member, and an inclined surface portion intersecting with the end surface portion and the peripheral surface portion. The second back-up ring has a cross-sectional shape having an end surface portion in contact with the seal ring, a peripheral surface portion facing a bottom surface portion of the mounting groove, and an inclined surface portion that is provided to correspond to the inclined surface portion of the first back-up ring. A contact surface portion that is a plane perpendicular to the axis in contact with the opposing-sealing-fluid-side side surface portion of the mounting groove is provided in an inner peripheral end of the inclined surface portion of the second back-up ring. The inner diameter size of the first back-up ring is set to be larger than the outer diameter size of the contact surface portion of the second back-up ring. The outer diameter size of the first back-up ring is set to be smaller than the inner diameter size of the other member.

In the sealing device of the present invention having the above-described configuration, the contact surface portion that is a plane perpendicular to the axis in contact with the opposing-sealing-fluid-side side surface portion of the mounting groove is provided in the inner peripheral end of the inclined surface portion of the second back-up ring; therefore, by bringing the contact surface portion that is a plane perpendicular to the axis into contact with the side surface portion of the mounting groove from the beginning of the mounting in the mounting groove, the overall second back-up ring does not move to a direction of getting close to the side surface portion of the mounting groove. Therefore, if the distance between the side surface portion of the mounting groove and the seal ring is reduced when the sealing device is inserted, the overall second back-up ring does not move to the direction of getting close to the side surface portion of the mounting groove; therefore, the second back-up ring does not press the first back-up ring, and the first back-up ring is not deformed as its outer diameter size is not expanded either. Accordingly, there never arises a situation in which the first back-up ring interferes with the opening periphery of the shaft hole when inserted; therefore, it is possible to suppress the damage on the first back-up ring caused by the interference.

As for the shape of the back-up ring other than the above-described contact surface portion that is a plane perpendicular to the axis, the first back-up ring and the second back-up ring can be both triangular in cross-section; however, in a case where the inclined surface portion of the first back-up ring is a surface with a concave circular cross-section, and the inclined surface portion of the second back-up ring is a surface with a convex circular cross-section, and the end surface portion of the second back-up ring is a surface with a concave circular cross-section, the following effects are exerted.

That is, if high pressure acts on the seal ring in a state where an actual equipment is in operation after insertion of the sealing device, the seal ring presses the end surface portion with a concave circular cross-section in the second back-up ring, thus the second back-up ring is elastically deformed, which causes its outer diameter size to be expanded, thereby pressing the first back-up ring. The pressed first back-up ring is also elastically deformed, which causes its outer diameter size to be expanded, and comes in contact with the other member, or reduces the radial distance to the other member. Accordingly, it is possible to expect the sealing effect of the first back-up ring elastically deformed outward in a radial direction in this way.

Effect of the Invention

According to the present invention, as described above, in the sealing device composed of a combination of the seal ring mounted in the mounting groove with a rectangular cross-section, the first back-up ring, and the second back-up ring, it is possible to suppress the diameter expansion of the first back-up ring when inserted, thereby suppressing the damage on the first back-up ring, and we can expect the sealing effect due to the first back-up ring.

DETAILED DESCRIPTION OF PREFERRED EMBODIMENTS

The present invention includes the following embodiments.

(1) General-use back-up ring used in a rectangular groove for a high-pressure application is provided. The back-up ring is composed of a combination of a hard back-up ring (a first back-up ring) and a soft back-up ring (a second back-up ring).

(2) The soft back-up ring is mounted so that there is no gap left on the non-pressurized side. The hard back-up ring is smaller than the inner diameter of an other-side housing (the other member) so as not to interfere when the sealing device is inserted. That is, the soft back-up ring is installed so that there is no gap with a groove side surface, and there is provided the hard back-up ring of which the outer diameter is smaller than the inner diameter of the housing, which allows the hard back-up ring to be mounted in this state. In other words, the soft back-up ring is provided with a portion in parallel contact with the groove side surface, thereby does not move when attached (when inserted); therefore, the soft back-up ring does not push up the hard back-up ring, and the diameter of the hard back-up ring is not expanded.

(3) The mating surfaces of the hard back-up ring and the soft back-up ring are formed into an arch. The seal ring contact side of the soft back-up ring is formed into an arch. By forming them into an arch, when subjected to high pressure after they are mounted, an O-ring (a seal ring) deforms the arch-like soft back-up ring to cause its diameter to be expanded, and pushes up the hard back-up ring, so that the sealing performance is ensured.

Subsequently, an embodiment of the present invention is described with reference to the drawings.

Figure 1:
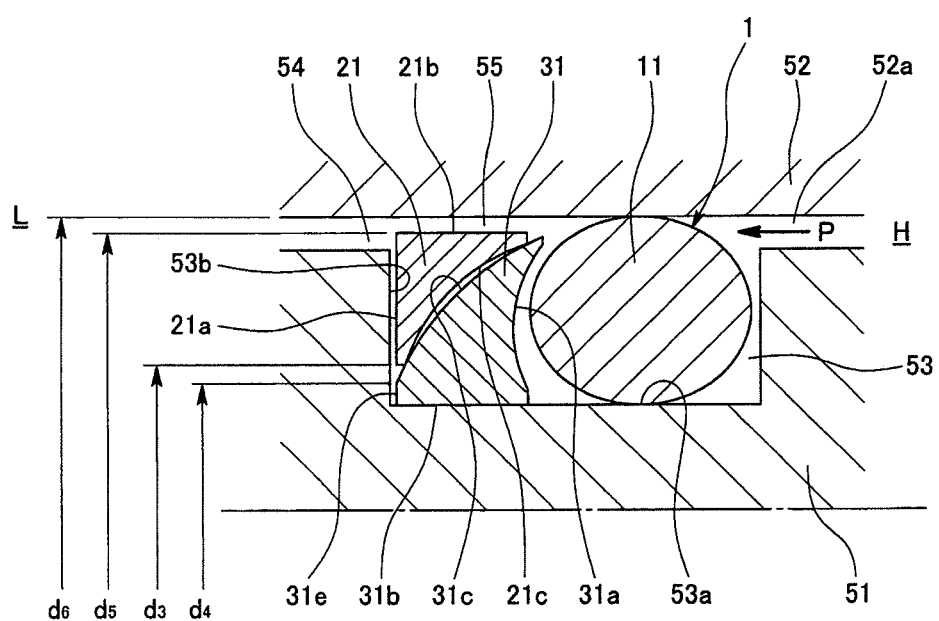
FIG. 1 is a cross-sectional diagram of main parts of a sealing device according to an embodiment of the present invention.
Figure 2:
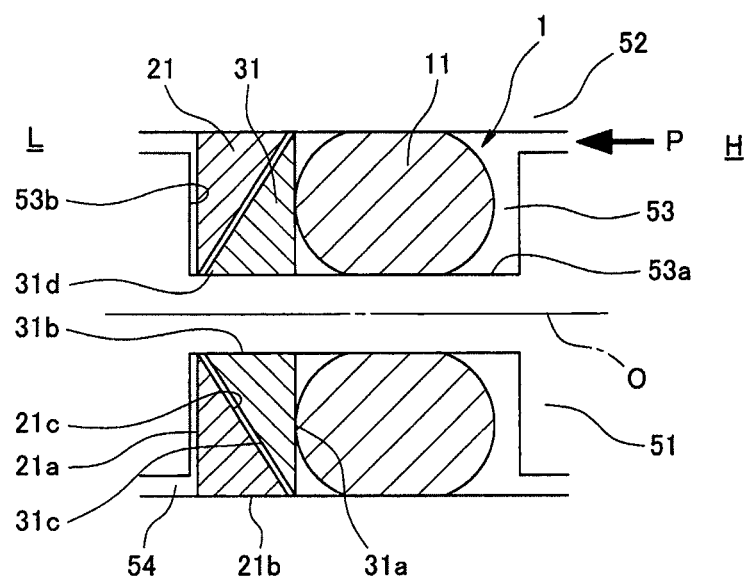
FIG. 2 is a cross-sectional diagram of a sealing device according to a conventional example.
Figure 3A:
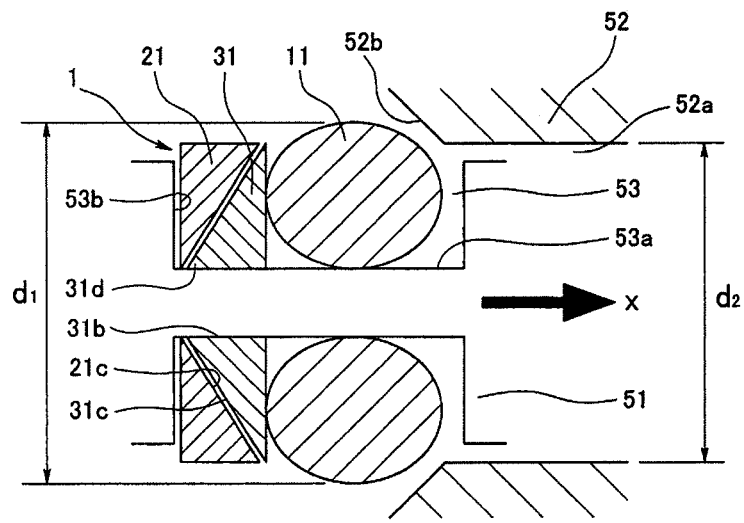
FIGS. 3A and 3B are explanatory diagrams illustrating a mounting step of the sealing device.
Figure 3B:
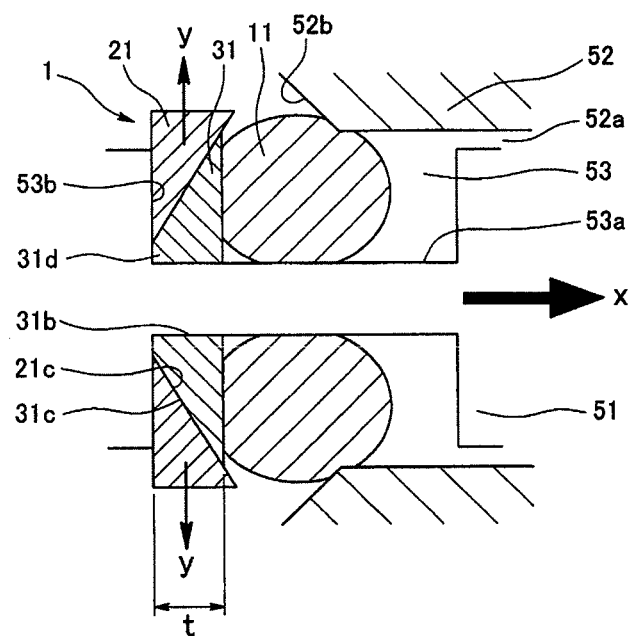

FIG. 1 shows cross-sections of main parts of a sealing device 1 according to the embodiment of the present invention. The sealing device 1 according to the embodiment is one used in a high-pressure seal portion of hydraulic equipment such as a direct-injection injector, and is configured as below.

That is, the sealing device 1 is placed in an annular gap between two members facing each other, namely a shaft (one of the members) 51 and a housing (the other member) 52 to seal in sealing fluid existing on the high-pressure side H that is on the right of the drawing so that the sealing fluid does not leak to the low-pressure side (the atmosphere side) L that is on the left of the drawing. The sealing device 1 includes an O-ring 11 as a seal ring, a first back-up ring 21, and a second back-up ring 31. The O-ring 11 is mounted in an annular mounting groove 53 provided on the peripheral surface of the shaft 51, and is in close contact with the inner peripheral surface of a shaft hole of the housing 52. The first back-up ring 21 is placed on the opposing sealing fluid side (the low-pressure side L) of the O-ring 11, and is likewise mounted in the mounting groove 53. The second back-up ring 31 is placed between the O-ring 11 and the first back-up ring 21, and is likewise mounted in the mounting groove 53. Instead of the O-ring 11, a seal ring with another cross-sectional shape, such as a D-ring or an X-ring, can be used.

The O-ring 11 is made of a rubbery elastic body. The first back-up ring 21 is made of, for example, nylon resin harder than the second back-up ring 31. The second back-up ring 31 is made of, for example, PTFE resin softer than the first back-up ring 21.

The mounting groove 53 is formed as a rectangular groove with a rectangular cross-section because it is easy to process. Therefore, a sort of tapered shape is not formed in the groove, and the mounting groove 53 is a combination of only a bottom surface portion 53a that is a cylindrical surface and both side surface portions 53b that are a plane perpendicular to the axis.

The first back-up ring 21 has an end surface portion 21a that is a plane perpendicular to the axis on the opposing sealing fluid side (the low-pressure side L) thereof in contact with the side surface portion 53b of the mounting groove 53, a peripheral surface portion 21b that is a cylindrical surface on the outer peripheral side thereof in contact with the inner peripheral surface of the shaft hole of the housing 52, and an inclined surface portion 21c that is a tapered surface intersecting with the end surface portion 21a and the peripheral surface portion 21b, and is formed to be triangular (right triangular) or substantially triangular in cross-section. The diameter size (the inner diameter size) of the inclined surface portion 21c is tapered off from the sealing fluid side (the high-pressure side H) to the opposing sealing fluid side (the low-pressure side L).

The second back-up ring 31 has an end surface portion 31a on the sealing fluid side (the high-pressure side H) thereof in contact with the O-ring 11, a peripheral surface portion 31b that is a cylindrical surface on the inner peripheral side thereof in contact with the bottom surface portion 53a of the mounting groove 53, and an inclined surface portion 31c that is a tapered surface intersecting with the end surface portion 31a and the peripheral surface portion 31b, and is formed to be triangular (right triangular) or substantially triangular in cross-section. The diameter size (the outer diameter size) of the inclined surface portion 31c is tapered off from the sealing fluid side (the high-pressure side H) to the opposing sealing fluid side (the low-pressure side L).

A contact surface portion 31e that is a plane perpendicular to the axis in contact with the side surface portion 53b of the mounting groove 53 is provided in an inner peripheral end of the inclined surface portion 31c of the second back-up ring 31, and the inner diameter size $d_3$ of the first back-up ring 21 is set to be larger than the outer diameter size $d_4$ of the contact surface portion 31e. Therefore, since the end surface portion 21a of the first back-up ring 21 is located on the outer peripheral side of the contact surface portion 31e of the second back-up ring 31, the contact surface portion 31e of the second back-up ring 31 and the end surface portion 21a of the first back-up ring 21 enable the both back-up rings 21 and 31 to be in contact with the side surface portion 53b of the mounting groove 53 at the same time.

Furthermore, the outer diameter size $d_5$ of the first back-up ring 21 is set to be smaller than the inner diameter size $d_6$ of the housing 52 so that the first back-up ring 21 does not interfere with an opening periphery (not shown) of the shaft hole of the housing 52 when inserted.

Moreover, the inclined surface portion 21c of the first back-up ring 21 and the inclined surface portion 31c of the second back-up ring 31 are provided to correspond to each other; the inclined surface portion 21c of the first back-up ring 21 is a surface with a concave circular cross-section, and the inclined surface portion 31c of the second back-up ring 31 is a surface with a convex circular cross-section. Furthermore, the end surface portion 31a of the second back-up ring 31 is also a surface with a concave circular cross-section.

In the sealing device 1 having the above-described configuration, the first back-up ring 21 is placed on the opposing sealing fluid side (the low-pressure side L) of the O-ring 11, and therefore, it is possible to prevent the O-ring 11 from protruding into a gap 54 between the shaft 51 and the housing 52 and being damaged when subjected to high pressure P; furthermore, the second back-up ring 31 is placed between the O-ring 11 and the first back-up ring 21, and therefore, it is possible to prevent the O-ring 11 from protruding into a gap 55 between the first back-up ring 21 and the housing 52 and being damaged. Accordingly, it is possible to suppress the degradation of sealing performance caused by the O-ring 11 protruding into the gap 54 or 55 and being damaged.

Furthermore, the contact surface portion 31e that is a plane perpendicular to the axis in contact with the opposing-sealing-fluid-side side surface portion 53b of the mounting groove 53 is provided in the inner peripheral end of the inclined surface portion 31c of the second back-up ring 31; therefore, by bringing the contact surface portion 31e that is a plane perpendicular to the axis into contact with the side surface portion 53b of the mounting groove 53 from the beginning of the mounting in the mounting groove 53, the overall second back-up ring 31 does not move to a direction of getting close to the side surface portion 53b of the mounting groove 53.

Therefore, when the sealing device 1 is inserted into a shaft hole 52a of the housing 52, the overall second back-up ring 31 does not move to the direction of getting close to the side surface portion 53b of the mounting groove 53, thus the second back-up ring 31 does not press the first back-up ring 21, which prevents the first back-up ring 21 from deformation of its outer diameter size $d_5$ being expanded. Accordingly, there never arises a situation in which the first back-up ring 21 interferes with the opening periphery of the shaft hole 52a when inserted; therefore, it is possible to suppress the damage on the first back-up ring 21 caused by the interference.

Moreover, the inclined surface portion 21c of the first back-up ring 21 is a surface with a concave circular cross-section, the inclined surface portion 31c of the second back-up ring 31 is a surface with a convex circular cross-section, and the end surface portion 31a of the second back-up ring 31 is a surface with a concave circular cross-section; therefore, if high pressure P acts on the O-ring 11, the O-ring 11 presses the end surface portion 31a with a concave circular cross-section in the second back-up ring 31, and the second back-up ring 31 is elastically deformed, which causes its outer diameter size to be expanded, thereby pressing the first back-up ring 21. The pressed first back-up ring 21 is also elastically deformed, which causes its outer diameter size d5 to be expanded, and, as a result, comes in contact with the inner surface of the housing 52, or at least reduces the radial distance to the inner surface of the housing 52. Accordingly, the first back-up ring 21 elastically deformed outward in a radial direction in this way exerts the sealing function, and therefore, it is possible to expect the sealing effect of the first back-up ring 21, and is possible to enhance the sealing performance of the sealing device 1.

DESCRIPTION OF REFERENCE NUMERALS 1 sealing device
11 seal ring
21 first back-up ring
21a, 31a end surface portion
21b, 31b peripheral surface portion
21c, 31c inclined surface portion
31 second back-up ring
31d corner
31e contact surface portion
51 shaft (one of two members)
52 housing (the other member)
52a shaft hole
53 mounting groove
53a bottom surface portion
53b side surface portion
54, 55 gap

What is claimed is:

1. A sealing device that is placed between two structures facing each other to seal in sealing fluid, the sealing device comprising:
   a seal ring that is mounted in a mounting groove provided on one of the two structures, and is in close contact with the other structure;
   a first back-up ring placed on an opposing sealing fluid side of the seal ring; and
   a second back-up ring placed between the seal ring and the first back-up ring, wherein
   the first back-up ring is made of a material that is harder than a material that the second back-up ring is made of,
   the mounting groove is a groove with a rectangular cross-section,
   the first back-up ring has a shape having an end surface in contact with an opposing-sealing-fluid-side surface of the mounting groove, a peripheral surface facing the other structure, and an inclined surface intersecting with the end surface and the peripheral surface,
   the second back-up ring has a shape having an end surface in contact with the seal ring, a peripheral surface facing a bottom surface of the mounting groove, and an inclined surface that is provided to correspond to the inclined surface of the first back-up ring,
   a contact surface that is a plane perpendicular to an axis in contact with the opposing-sealing-fluid-side surface of the mounting groove is provided in an inner peripheral end of the inclined surface of the second back-up ring,
   an inner diameter size of the first back-up ring is set to be larger than an outer diameter size of the contact surface of the second back-up ring, and
   an outer diameter size of the first back-up ring is set to be smaller than an inner diameter size of the other structure.

2. The sealing device according to claim 1, wherein
   the inclined surface of the first back-up ring is a surface with a concave circular cross-section,
   the inclined surface of the second back-up ring is a surface with a convex circular cross-section, and
   the end surface of the second back-up ring is a surface with a concave circular cross-section.

3. The sealing device according to claim 1, wherein the seal ring includes a cross-sectional O-ring shape.

4. The sealing device according to claim 1, wherein a gap is disposed between the peripheral surface of the first back-up ring and an inner surface of the other structure that is opposed to the peripheral surface of the first back-up ring.

5. The sealing device according to claim 1, wherein a gap is disposed between a corner of the second back-up ring and an inner surface of the other structure that is opposed to the corner of the second back-up ring, the corner being formed between the inclined surface of the second back-up ring and the end surface of the second back-up ring.

6. The sealing device according to claim 1, wherein when at least a threshold pressure acts on the seal ring, the seal ring presses the end surface of the second back-up ring to elastically expand the second back-up ring radially, and the second back-up ring presses the first back-up ring to elastically expand the first back-up ring radially so that the first back-up ring closes a gap between the peripheral surface of the first back-up ring and an inner surface of the other structure that is opposed to the peripheral surface of the first back-up ring.

7. The sealing device according to claim 1, wherein a radial gap exists between the contact surface of the second back-up ring and the end surface of the first back-up ring.

8. The sealing device according to claim 1, wherein the peripheral surface of the first back-up ring is disposed radially outward with respect to a corner of the second back-up ring formed between the inclined surface of the second back-up ring and the end surface of the second back-up ring.

9. The sealing device according to claim 1, wherein the first back-up ring is made of nylon resin and the second back-up ring is made of PTFE (polytetrafluoroethylene) resin.

10. The sealing device according to claim 1, wherein a crescent shaped gap is formed between the inclined surface of the first back-up ring and the inclined surface of the second back-up ring.

11. The sealing device according to claim 1, wherein a corner between the peripheral surface of the first back-up ring and the inclined surface of the first back-up ring includes a flat surface so that the corner is not pointed.

12. The sealing device according to claim 1, wherein a corner between the end surface of the first back-up ring and the inclined surface of the first back-up ring includes a flat surface so that the corner is not pointed.

13. Hydraulic equipment comprising the sealing device according to claim 1.

14. A direct-injection injector comprising the sealing device according to claim 1.

* * * * *